United States Patent
Siomina et al.

(10) Patent No.: US 8,738,041 B2
(45) Date of Patent: May 27, 2014

(54) NODES AND METHODS FOR ENHANCING POSITIONING

(75) Inventors: Iana Siomina, Solna (SE); Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 259 days.

(21) Appl. No.: 13/057,765

(22) PCT Filed: Jan. 31, 2011

(86) PCT No.: PCT/SE2011/050098
§ 371 (c)(1),
(2), (4) Date: Feb. 6, 2011

(87) PCT Pub. No.: WO2012/023891
PCT Pub. Date: Feb. 23, 2012

(65) Prior Publication Data
US 2012/0040687 A1 Feb. 16, 2012

Related U.S. Application Data

(60) Provisional application No. 61/374,031, filed on Aug. 16, 2010.

(51) Int. Cl.
*H04W 24/00* (2009.01)
(52) U.S. Cl.
USPC ............. 455/456.6; 455/456.2; 455/456.1; 455/450; 370/329
(58) Field of Classification Search
USPC ........ 455/404.2, 456.1–457, 436–444, 404.1, 455/422.1, 450–455, 464, 509; 340/539.13, 340/988–996; D10/104.2; 370/321–337, 370/339, 341–348, 431–463
See application file for complete search history.

(56) References Cited

U.S. PATENT DOCUMENTS

| | | | |
|---|---|---|---|
| 2007/0224990 A1* | 9/2007 | Edge et al. | ............. 455/436 |
| 2008/0305825 A1 | 12/2008 | Shaheen | |
| 2009/0121939 A1 | 5/2009 | Kim et al. | |
| 2010/0120435 A1 | 5/2010 | Mia et al. | |

OTHER PUBLICATIONS

3GPP TS 36.305 V9.3.0 (Jun. 2010): "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", hereinafter TS36.305.*

(Continued)

*Primary Examiner* — Ronald Eisner
(74) *Attorney, Agent, or Firm* — Coats and Bennett PLLC

(57) ABSTRACT

The disclosure relates to a positioning node 54, a CN node 53, a RN node 52, and a UE 51 of a wireless network, and to a related method of supporting UE positioning. The method comprises transmitting UE radio access capability information (S30) and/or radio network node capability information (S10) to the positioning node 54. The transmission of UE radio access capability information is either unsolicited or triggered by a request (S20). The UE radio access capability information may be transmitted from the CN node (S31), from the RN node (S32) or from the UE (S33), and the RN node capability information is received from the RN node itself (S10). The positioning node 54 supports positioning of the UE 51 based on the received UE radio access capability information and/or the radio network node capability information.

15 Claims, 11 Drawing Sheets

(56) References Cited

OTHER PUBLICATIONS

3GPP TS 36.306 V9.2.0 (Jun. 2010): "3rd Generation Partnership Project; Technical Specification Group Radio Access Network; Evolved Universal Terrestrial Radio Access (E-UTRA); User Equipment (UE) radio access capabilities (Release 9)", hereinafter TS36.306.*

PCT International Search Report, mailed Jun. 10, 2011, in connection with International Application No. PCT/SE2011/050098.

PCT Written Opinion, mailed Jun. 10, 2011, in connection with International Application No. PCT/SE2011/050098.

3GPP TS 36.306 V9.2.0 Technical Specification Group Radio Access Network; Evolved Universal Terrestrial Radio Access (E-UTRA); User Equipment (UE) radio access capabilities (Release 9), Jun. 2010.

3GPP TS36.331 V9.3.0 Technical Specification Group Radio Access Network; Evolved Universal Terrestrial Radio Access (E-UTRA); Radio Resource Control (RRC): Protocol specification (Release 9), Jun. 2010.

* cited by examiner

```
RequestCapabilities-r9-IEs ::= SEQUENCE {
  commonIEsRequestCapabilities
          CommonIEsRequestCapabilities
          OPTIONAL,         -- Need ON
  a-gnss-RequestCapabilities
          A-GNSS-RequestCapabilities
          OPTIONAL,
  otdoa-RequestCapabilities
          OTDOA-RequestCapabilities
          OPTIONAL,
  ecid-RequestCapabilities
          ECID-RequestCapabilities
          OPTIONAL,
  epdu-RequestCapabilities
          EPDU-Sequence
          OPTIONAL,         -- Need ON
  ...
}
```

Fig. 4d

```
-- ASN1START
OTDOA-ProvideCapabilities ::= SEQUENCE {
        otdoa-Mode
        BIT STRING { ue-assisted (0) }
        (SIZE (1..8)),
        ...
}
```

Fig. 4e

```
ProvideCapabilities-r9-IEs ::= SEQUENCE {
   commonIEsProvideCapabilities
         CommonIEsProvideCapabilities
         OPTIONAL,          -- Need ON
   a-gnss-ProvideCapabilities
         A-GNSS-ProvideCapabilities
         OPTIONAL,          -- Need ON
   otdoa-ProvideCapabilities
         OTDOA-ProvideCapabilities
         OPTIONAL,          -- Need ON
   ecid-ProvideCapabilities
         ECID-ProvideCapabilities
         OPTIONAL,          -- Need ON
   epdu-ProvideCapabilities
         EPDU-Sequence
         OPTIONAL,          -- Need ON
   ...
}
```

Fig. 4f

```
-- ASN1START
ECID-ProvideCapabilities ::= SEQUENCE {
         ecid-MeasSupported
         BIT STRING { rsrpSup (0),
                  rsrqSup (1),
                  ueRxTxSup (2) }
                  (SIZE(1..8)),
         ...
}
```

Fig. 4g

NODES AND METHODS FOR ENHANCING POSITIONING

TECHNICAL FIELD

The present invention relates to a method of supporting positioning of a wireless device in a positioning node, in a wireless device, in a radio network node, and in a core network node of a wireless communication system. The invention also relates to a positioning node, a wireless device, a radio network node, and a core network node of a wireless communication system.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a user equipment (UE) 150 is wirelessly connected to a radio base station (RBS) 110a commonly referred to as an evolved NodeB (eNodeB), as illustrated in FIG. 1a. Each eNodeB 110a-c serves one or more areas each referred to as cells 120a-c, and are connected to the core network. In LTE, the eNodeBs 110a-c are connected to a Mobility Management Entity (MME) 130 in the core network. A positioning node, also called a location server, in the control plane architecture in FIG. 1a is connected to the MME 130. The positioning node is a physical or logical entity that manages positioning for a so called target device, i.e. a wireless device that is being positioned, and is in the control plane architecture referred to as an Evolved Serving Mobile Location Center (E-SMLC) 140. As illustrated in FIG. 1a, the E-SMLC 140 may be a separate network node, but it may also be a functionality integrated in some other network node. In a user plane architecture, the positioning is a part of a Secure User Plane Location (SUPL) Location Platform (SLP). Hereinafter, the general term wireless device may be a UE, a laptop, a small radio node or base station, a relay, or a sensor. The UE may be a mobile telephone, a pager, a headset, a laptop computer and other mobile terminals. The wireless device may also refer to a device or node being positioned in general, often referred to as a Location Service (LCS) target. LTE Positioning Protocol (LPP) and LTE Positioning Protocol annex (LPPa) are protocols used for carrying out positioning in the control plane architecture in LTE. LPP is also used in the user plane architecture, whilst LPPa may be used to support user plane positioning. There may also be LPP extensions, e.g. LPPe, which may be included in LPP messages. When receiving a positioning request, the E-SMLC may request positioning related parameters from eNodeB via LPPa. The E-SMLC then assembles and sends assistance data and the request for the positioning to the target wireless device, e.g. the UE, via LPP. FIGS. 1b-c illustrate example architectures and protocol solutions of a positioning system in an LTE network. In the control plane solution, illustrated in FIG. 1b, the UE communicates with the E-SMLC transparently via the eNodeB and the MME over LPP, and the eNodeB communicates with the E-SMLC transparently via the MME over LPPa. The user plane solution illustrated in FIG. 1c does not rely on the LPPa protocol, although 3GPP allows for the possibility of interworking between the control and user plane positioning architectures. The SLP is the positioning node for user-plane positioning, similar to E-SMLC for control plane positioning, and there may or may not be an interface between the two positioning servers.

UE positioning is a process of determining UE coordinates in space. Once the coordinates are available, they may be mapped to a certain place or location. The mapping function and delivery of the location information on request are parts of a location service which is required for basic emergency services. Services that further exploit a location knowledge or that are based on the location knowledge to offer customers some added value are referred to as location-aware and location-based services. The possibility of identifying a wireless device's geographical location in the network has enabled a large variety of commercial and non-commercial services, e.g., navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission regulating the area of telecommunications in the United States.

In many environments, a wireless device position can be accurately estimated by using positioning methods based on Global Positioning System (GPS). Nowadays, networks also often have a possibility to assist wireless devices in order to improve the device receiver sensitivity and GPS start-up performance, as for example in an Assisted-GPS (A-GPS) positioning method. GPS or A-GPS receivers, however, may not necessarily be available in all wireless devices. Furthermore, GPS is known to often fail in indoor environments and urban canyons. A complementary terrestrial positioning method, called Observed Time Difference of Arrival (OTDOA), has therefore been standardized by 3GPP. In addition to OTDOA, the LTE standard also specifies methods, procedures, and signaling support for Enhanced Cell ID (E-CID) and Assisted-Global Navigation Satellite System (A-GNSS) positioning. In future, Uplink Time Difference of Arrival (UTDOA) may also be standardized for LTE.

E-CID Positioning

With E-CID, the following sources of position information are involved: the Cell Identification (CID) and the corresponding geographical description of the serving cell, the Timing Advance (TA) of the serving cell, the CIDs and the corresponding signal measurements of the cells (up to 32 cells in LTE, including the serving cell), as well as Angle of Arrival (AoA) measurements. The following UE measurements can be utilized for E-CID in LTE: E-UTRA carrier Received Signal Strength Indicator (RSSI), Reference Signal Received Power (RSRP), Reference Signal Received Quality (RSRQ), and UE receive-transmit (Rx-Tx) time difference. The E-UTRAN measurements available for E-CID are eNodeB Rx-Tx time difference, TA Type 1 corresponding to (eNodeB Rx-Tx time difference)+(UE Rx-Tx time difference), TA Type 2 corresponding to eNodeB Rx-Tx time difference, and uplink (UL) AoA. UE Rx-Tx measurements are typically used for the serving cell, and e.g. RSRP and RSRQ as well as AoA can be utilized for any cell and can also be conducted on a frequency different from that of the serving cell.

UE E-CID measurements are reported by the UE to the positioning server over the LPP, and the E-UTRAN E-CID measurements are reported by the eNodeB to the positioning node over the LPPa.

OTDOA Positioning

With OTDOA, a wireless device such as a UE measures the timing differences for downlink reference signals received from multiple distinct locations. For each measured neighbor cell, the UE measures Reference Signal Time Difference (RSTD) which is the relative timing difference between a neighbor cell and the reference cell. As illustrated in FIG. 2, the UE position estimate is then found as the intersection 230 of hyperbolas 240 corresponding to the measured RSTDs. At least three measurements from geographically dispersed RBSs 210a-c with a good geometry are needed to solve for two coordinates of the UE. In order to find the position, precise knowledge of transmitter locations and transmit timing offsets is needed. Position calculations may be conducted, for example by a positioning node such as the E-SMLC or the SLP in LTE, or by the UE. The former approach corresponds to the UE-assisted positioning mode, and the latter corresponds to the UE-based positioning mode.

In UTRAN Frequency Division Duplex (FDD), an SFN-SFN type 2 measurement (SFN stands for System Frame Number) performed by the UE is used for the OTDOA positioning method. This measurement is the relative timing difference between cell j and cell i based on the primary Common Pilot Channel (CPICH) from cell j and cell i. The UE reported SFN-SFN type 2 is used by the network to estimate the UE position. The OTDOA and other positioning methods such as E-CID are to be used also for emergency calls. Hence the response time of these measurements should be as low as possible to meet the emergency call requirements.

Positioning Reference Signals

To enable positioning in LTE and facilitate positioning measurements of a proper quality and for a sufficient number of distinct locations, new physical signals dedicated for positioning, such as positioning reference signals, (PRS) have been introduced, and low-interference positioning subframes have been specified in 3GPP. PRS are transmitted from one antenna port according to a pre-defined pattern, as described in more detail below.

A frequency shift, which is a function of a Physical Cell Identity (PCI), can be applied to the specified PRS patterns to generate orthogonal patterns and model the effective frequency reuse of six (R6), which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., cell-specific reference signals (CRS) may also be used for positioning measurements.

PRS are transmitted in pre-defined positioning subframes grouped by a number N_prs of consecutive subframes, i.e. one positioning occasion, as illustrated in FIG. 3. Positioning occasions occur periodically with a certain periodicity of N subframes, corresponding to a time interval T_prs between two positioning occasions. The standardized time intervals T_prs are 160, 320, 640, and 1280 ms, and the number of consecutive subframes N_prs are 1, 2, 4, and 6.

General UE Radio Access Capability

The UE radio access capability parameters that are currently specified in the 3GPP technical specification TS 36.306 comprise:

ue-Category, which indicates e.g. the maximum number of supported layers for spatial multiplexing in downlink;

Radio Frequency (RF) parameters, such as supportedBandListEUTRA which defines what E-UTRA RF bands that are supported by the UE. For each band, support for either only half duplex operation, or full duplex operation is indicated. For Time Division Duplex (TDD), the half duplex indication is not applicable;

Measurement parameters, such as interFreqNeedForGaps and interRAT-NeedForGaps. These parameters define for each supported E-UTRA band whether measurement gaps are required to perform measurements on other supported E-UTRA radio frequency bands and on each supported RAT/band combination;

Inter-RAT parameters, which are used e.g. for indication of the supported band lists for UTRA FDD, UTRA TDD, GSM/EDGE Radio Network (GERAN);

General parameters, such as accessStratumRelease which defines the release of the E-UTRA layer 1, 2, and 3 specifications supported by the UE e.g. Rel-8 and Rel-9, and deviceType which defines whether the device does not benefit from NW-based battery consumption optimisation;

Closed Subscriber Group (CSG) Proximity Indication parameters, such as intraFreqProximityIndication, interFreqProximityIndication and utran-ProximityIndication which define whether the UE supports proximity indication in the RAT (E-UTRAN or UTRAN) cells comprised in the UE's CSG whitelist. The indication is thus used to inform whether the UE is able to report that it is entering or leaving the proximity of cell(s) included in its CSG whitelist, wherein the CSG whitelist may either be manually entered via a UE interface or autonomously detected by the UE;

Neighbor cell System Information (SI) acquisition parameters, such as intraFreqSI-AcquisitionForHO, interFreqSI-AcquisitionForHO, utran-SI-AcquisitionForHO which define whether the UE supports acquisition of relevant information from a neighboring intra-frequency cell by reading the SI of the neighboring cell using autonomous gaps, and reporting of the acquired information to the network.

The currently defined UE radio access capabilities and the lack of associated information available in the network and especially in the positioning node, have an impact on the positioning measurement requirements and on positioning performance, and causes unnecessary operations and procedures performed by the network.

SUMMARY

An object is therefore to address some of the problems and disadvantages outlined above, and to transmit radio access capability associated with a wireless device such as the UE radio access capabilities described previously, and/or radio network node capability information to the positioning node, allowing the positioning node to use either or both received capability information for supporting positioning.

This object and others are achieved by the methods, wireless device and nodes according to the independent claims, and by the embodiments according to the dependent claims.

In accordance with an embodiment, a method in a positioning node of a wireless communication system, of supporting wireless device positioning, is provided. The method comprises receiving at least one of the following: radio access capability information associated with a wireless device; and capability information associated with a radio network node from said radio network node. The method also comprises supporting positioning of the wireless device based on the received radio access capability information associated with the wireless device and/or the capability information associated with the radio network node.

In accordance with another embodiment, a method in a wireless device of a wireless communication system of supporting positioning of the wireless device is provided. The positioning is managed by a positioning node. The method comprises transmitting radio access capability information associated with the wireless device to the positioning node.

In accordance with still another embodiment, a method in a radio network node of a wireless communication system of supporting positioning of a wireless device controlled by the radio network node is provided. The positioning is managed by a positioning node connected to the radio network node. The method comprises transmitting at least one of the following to the positioning node: radio access capability information associated with the wireless device, and capability information associated with the radio network node.

In accordance with a further embodiment, a method in a core network node of a wireless communication system of supporting positioning of a wireless device associated with the core network node is provided. The positioning is managed by a positioning node connected to the core network node. The method comprises transmitting radio access capability information associated with the wireless device to the positioning node.

In accordance with another embodiment, a positioning node for a wireless communication system is provided. The positioning node comprises a receiving unit adapted to receive at least one of the following: radio access capability information associated with a wireless device; and capability information associated with a radio network node from said radio network node. The positioning node also comprises a positioning support unit adapted to support positioning of the wireless device based on the received at least one of the radio access capability information associated with the wireless device and the capability information associated with the radio network node.

In accordance with still another embodiment, a wireless device for a wireless communication system is provided. The wireless device is configured to support positioning managed by a positioning node, and comprises a transmitting unit adapted to transmit radio access capability information associated with the wireless device to the positioning node.

In a further embodiment, a radio network node for a wireless communication system is provided. The radio network node is configured to support positioning of a wireless device controlled by the radio network node. The positioning is managed by a positioning node connectable to the radio network node. The radio network node comprises a transmitting unit adapted to transmit at least one of the following to the positioning node: radio access capability information associated with the wireless device, and capability information associated with the radio network node.

In another embodiment, a core network node for a wireless communication system is provided. The core network node is configured to support positioning of a wireless device associated with the core network node. The positioning is managed by a positioning node connectable to the core network node. The core network node comprises a transmitting unit adapted to transmit radio access capability information associated with the wireless device to the positioning node.

An advantage of particular embodiments is that the target wireless device positioning accuracy and/or the positioning measurement performance is improved.

BRIEF DESCRIPTION OF THE DRAWINGS

FIGS. 4d-g illustrate information elements defined in 3GPP.

DETAILED DESCRIPTION

Figure 1A:
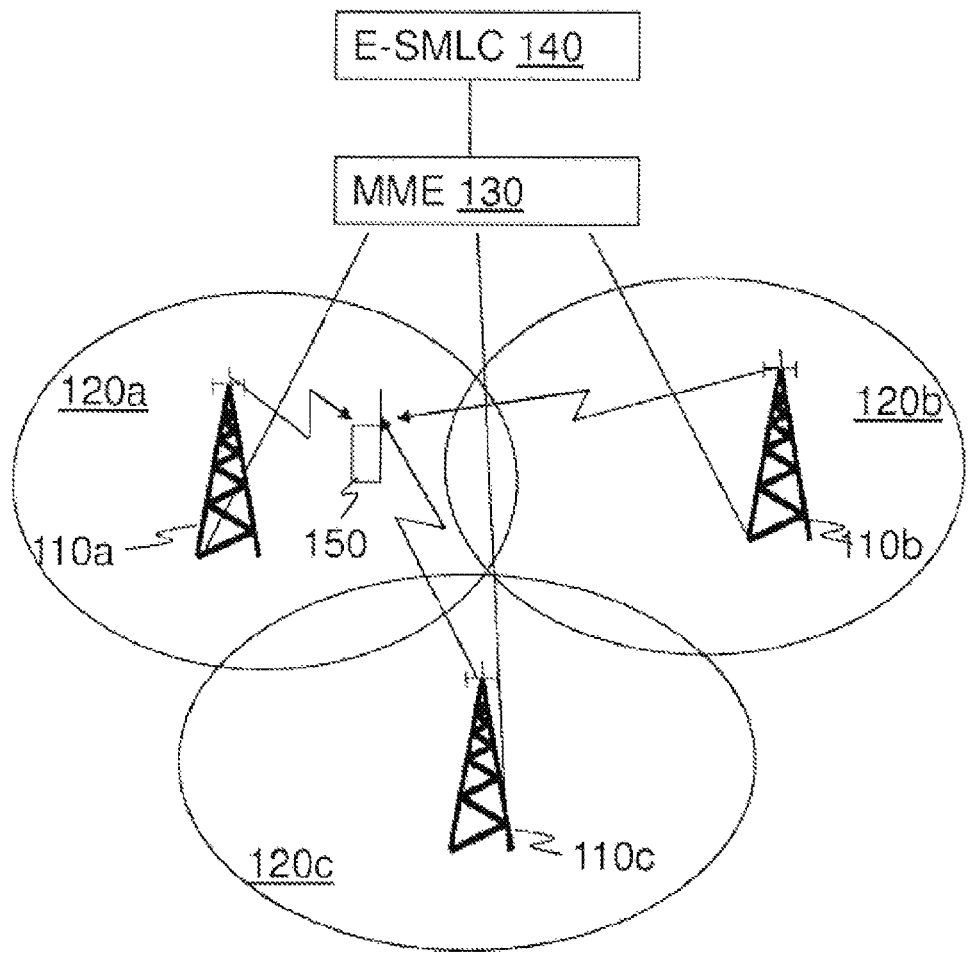
FIG. 1a is a block diagram schematically illustrating a conventional wireless communication system.
Figure 1B:
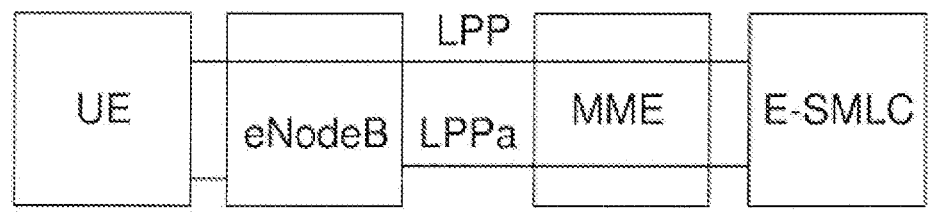
FIGS. 1b-1c are block diagrams schematically illustrating positioning related entities and protocols in LTE.
Figure 1C:
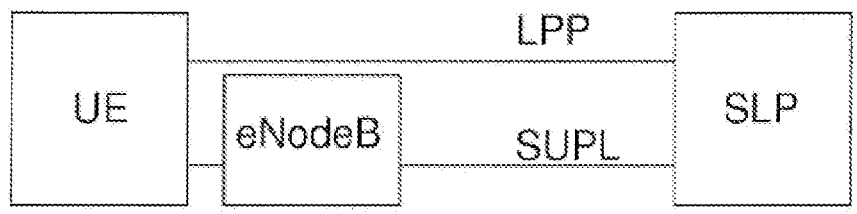
Figure 2:
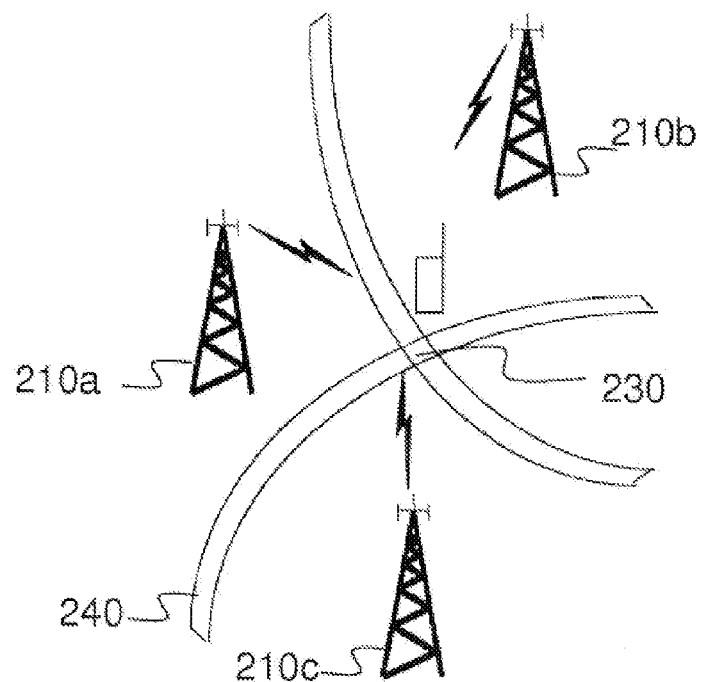
FIG. 2 is a block diagram illustrating the OTDOA principle.
Figure 3:
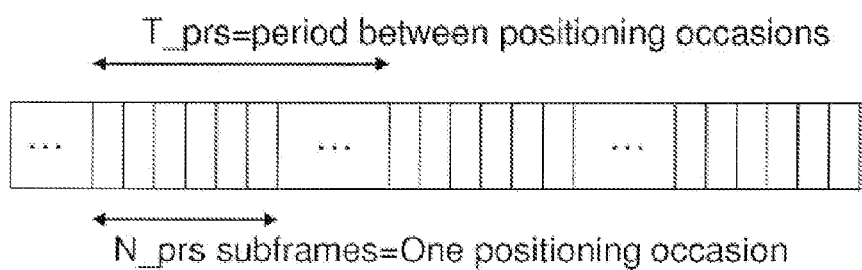
FIG. 3 illustrates the positioning subframe allocation in time for a cell.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of methods and nodes, they may also be embodied in a computer program product as well as in a system comprising a computer processor and a memory coupled to the processor, wherein the memory is encoded with one or more programs that may perform the method steps disclosed herein.

Embodiments are described herein by way of reference to particular example scenarios. Particular aspects are described in a non-limiting general context in relation to positioning in an LTE system, and to a UE as a positioning target device. It should though be noted that the embodiments may also be applied to other types of radio access networks with support for positioning, and to other types of positioning target devices such as small RBSs or relays.

This disclosure relates to procedures and signaling for increasing the awareness about UE and radio network node capabilities in the positioning node in order to improve positioning performance in current and future wireless networks, but also to ensure consistent configuration of the positioning measurement session and transmitting the relevant assistance data in e.g. LTE.

In embodiments the problem of creating the assistance data in the E-SMLC in LTE Release 9 of the 3GPP Technical Specifications without having knowledge of the UE radio access capabilities or the radio network node capabilities is addressed by a solution based on the following parts:
1. Signaling of the standardized UE radio access capability information to the positioning node from various possible sources;
2. Signaling of UE multi-carrier and carrier-aggregation related capability information to the positioning node from various possible sources;

3. Signaling of radio network node capability information to the positioning node;
4. Methods and procedures in the positioning node involving the signaling above and utilizing the obtained capability information;
5. Methods and procedures in a radio network node exploiting the UE radio access capability information to facilitate positioning measurements;
6. Methods and procedures enhancing positioning performance in heterogeneous networks;
7. Methods and procedures to enhance energy saving in the UE and radio network nodes by optimizing positioning configuration while utilizing the capability information signaled as described above;
8. Apparatus configured to carry out the foregoing signaling, methods and procedures;

If not explicitly stated, signaling between two nodes implies either signaling over direct physical links or signaling over logical links, e.g., involving higher-layer protocols such as LPP or LPPa described above.

Figure 4A:
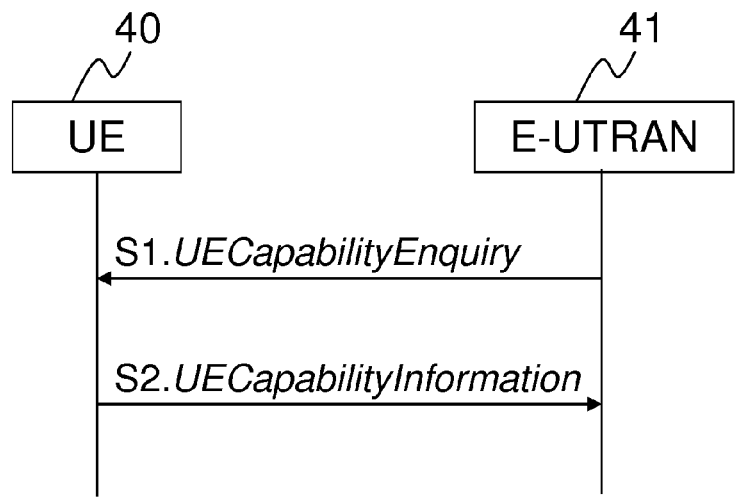
FIGS. 4a-c are signaling diagrams illustrating different cases of transfer of capability information between nodes in the network.

The UE radio access capability parameters that are currently specified in the 3GPP technical specification TS 36.306 and that are listed in the background section, are signaled as defined in 3GPP TS 36.331. The transfer of the UE radio access capabilities, illustrated in the signaling diagram in FIG. 4a is initiated by E-UTRAN 41 for a UE 40 in RRC CONNECTED state when the network needs additional UE radio access capability information. The E-UTRAN 41 sends a UECapabilityEnquiry message in S1 and the UE 40 returns a UECapabilityInformation in S2. If the UE has changed its E-UTRAN radio access capabilities, the UE shall request higher layers to initiate the necessary NAS procedures that would result in the update of UE radio access capabilities using a new Radio Resource Control (RRC) connection.

The UE radio access capability is not provided directly from one Core Network (CN) node to another. It will be uploaded to the MME when the E-UTRAN requests the UE radio access capability information from the UE. To avoid transmission of the capability information at each transition from idle state—when there is no NAS signalling connection between UE and network and the UE performs cell selection/reselection and Public Land Mobile Network (PLMN) selection—to connected state, the MME stores the UE radio access capability information during idle state. Furthermore, the MME shall, if the information is available, send its most up to date UE radio access capability information to the E-UTRAN in the S1 interface INITIAL CONTEXT SETUP REQUEST message, unless the UE is performing an Attach procedure or a Tracking Area Update (TAU) procedure for the first TAU following GERAN/UTRAN attach or for a UE radio access capability update. In the latter cases, the MME shall delete or mark as deleted any UE radio access capability information that it has stored. If the UE is performing a Service Request or other procedure and the MME does not have UE radio access capability information available or does have UE radio access capability information marked as deleted, then the MME sends an S1 interface INITIAL CONTEXT SETUP REQUEST message to the E-UTRAN without any UE radio access capability information in it. This triggers the E-UTRAN to request the UE radio access capability information from the UE and to upload it to the MME in the S1 interface UE CAPABILITY INFO INDICATION message.

Consequently, the standardized UE radio access capabilities are known to MME and to the eNodeB, but they are not known to the positioning node. The only UE capabilities that are communicated to the positioning node according to prior art are the UE positioning capabilities, as described hereinafter.

UE Positioning Capability Transfer From MME to Positioning Node

SLs is the interface between MME and the positioning node E-SMLC. The SLs interface is used to convey Location Service Application Protocol (LCS-AP) messages between these two nodes. The initiator of the location service request procedure, which may be the MME, sends a Location Request message to E-SMLC associated with the current serving cell for the target UE, and starts the timer T3×01. The Location Request message contains among others an optional element UE Positioning Capability. When the UE positioning capability is unknown, the E-SMLC may request it through LPP.

The UE Positioning Capability provides information about the LCS capabilities of the target UE and comprises only one single information element, LPP Support, which is a mandatory binary indicator. If the indicator is set to TRUE, it means that the LPP is supported by the UE.

If a location estimate is requested and subsequently obtained, the E-SMLC shall return a LCS-AP Location Response to the initiator of the location request. If assistance data for a UE is instead requested from the E-SMLC, e.g. in case of UE-based positioning, and the E-SMLC is able to successfully transfer this to the UE, the E-SMLC shall return an LCS-AP Location Response to the initiator of the location request, which may be the MME. This message shall not contain any parameters, as the absence of an LCS Cause parameter in this case implies that the transfer was successful. If the MME receives the LCS-AP Location Response for the corresponding request message, the MME shall stop the timer T3×01.

In case of unsuccessful operation, the LCS-AP Location Response message will contain an LCS Cause field. Upon receiving such a response message, the MME also stops the timer T3×01. In case of an expiry of the timer T3×01, the MME shall abort the procedure, release any resources allocated for this location request procedure and notify the node that triggered the Location Request about the error.

LPP Positioning Procedures for Positioning Capability Exchange

Figure 4B:
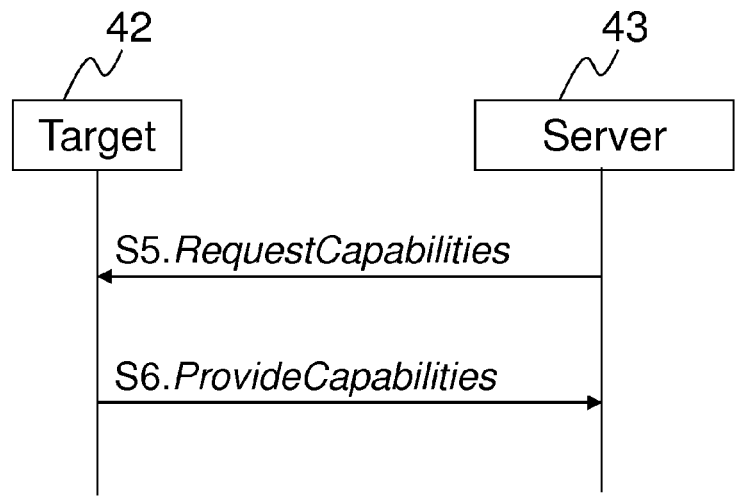
Figure 4C:
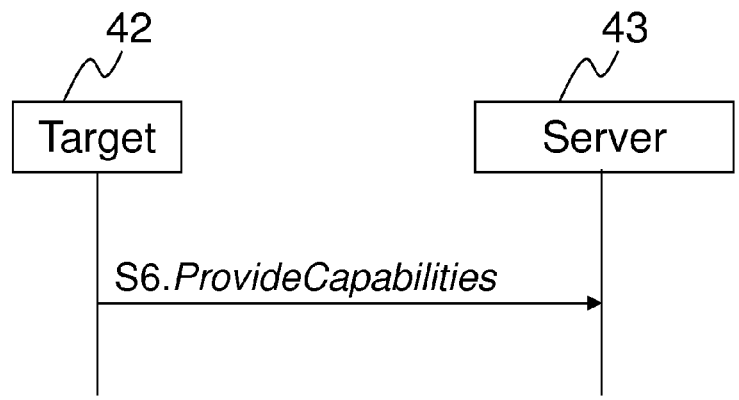

Capability transfer in the LTE positioning architecture is supported in the LPP. The signaling diagram in FIG. 4b illustrates the LPP capability transfer procedure involving a request (S5.RequestCapabilities) sent from the positioning server 43 to the positioning target device 42 and a response (S6. ProvideCapabilities) sent from the target 42 to the requesting server 43.The signaling diagram in FIG. 4c illustrates the LPP capability indication procedure used by the target 42 to unsolicited provide capabilities to the server 43. LPP procedures are not required to occur in any fixed order, e.g., the target device may transfer capability information to the server at any time if not already performed.

In both FIGS. 4b and 4c, the capability is transferred from a target 42 to a server 43. In the 3GPP control plane solution the wireless device, e.g. a UE, is the target device and the E-SMLC is the server. In the user plane solution, a SUPL Enabled Terminal (SET) is the target device and the SLP is the server. A UE request for capability from E-SMLC or delivery of the E-SMLC capability to the UE is not supported in the current standard. Furthermore, the positioning capability transfer procedure described above does not currently apply to uplink E-CID positioning.

When a target device receives a RequestCapabilities message, it shall include the device capabilities for each method included in the request for capabilities and deliver the response to the lower layers for transmission. If the message type is an LPP RequestCapabilities and some of the requested information is not supported, the target returns any information that may be provided in a normal response.

The information elements in the RequestCapabilities message are listed in FIG. 4d. The list comprises the A-GNSS, OTDOA, and ECID RequestCapabilities, as well as commonIEsRequestCapabilities and epdu RequestCapabilities, where EPDU stands for External Protocol Data Unit. The OTDOA and ECID RequestCapabilities information elements are currently defined as empty sequences. The commonIEsRequestCapabilities information element is provided for future extension. The epdu-RequestCapabilities are defined as an EPDU-Sequence containing information elements that are defined externally to LPP by other organizations.

The information elements in the ProvideCapabilities message are listed in FIG. 4f. The message has a similar structure to that of the RequestCapabilities message. In the current standard, for OTDOA, the target may inform the server about the supported positioning mode. Only UE assisted positioning is supported so far as illustrated in FIG. 4e, detailing the OTDOA ProvideCapabilities information element. For E-CID, the target may inform about the supported E-CID measurements, e.g. Reference Signal Received Power (RSRP), Reference Signal Received Quality (RSRQ), and UE receive-transmit time difference as illustrated in FIG. 4g, detailing the ECID ProvideCapabilities information element.

eNodeB Positioning Capabilities

The transfer of eNodeB positioning capabilities to the positioning node is currently not supported in the standard and there are no capability elements in LPPa. However, eNodeB capabilities may be transferred via O&M.

The Multi-Carrier Concept

A multi-carrier system, also called a carrier aggregation (CA) system, allows the UE to simultaneously receive and/or transmit data over more than one carrier frequency. The multi-carrier concept is used in both HSPA and LTE. Each carrier frequency is often referred to as a component carrier (CC) or simply a serving cell in the serving sector. More specifically the carrier frequencies are referred to as primary and secondary CC or serving cells.

In a multi-carrier system the primary CC carries all common and UE-specific control channels. The secondary CC may contain only necessary signaling information and signals. Signaling information or signals that are UE-specific may e.g. not be present in the secondary CC, since both primary uplink and downlink CCs are typically UE-specific. This means that different UEs in a cell may have different primary downlink CCs.

The simultaneous transmission and/or reception over the CCs enable the UE to significantly increase its data reception and transmission rates. For instance, an aggregation of two 20 MHz carriers in an LTE multi-carrier system would theoretically lead to a doubled data rate compared to that attained by a single 20 MHz carrier. The CCs may be contiguous or non-contiguous. Non-contiguous carriers may belong to the same frequency band or to different frequency bands. A hybrid carrier aggregation scheme comprising both contiguous and non-contiguous CCs are also envisaged in LTE.

An Intra-Radio Access Technology (RAT) multi-carrier system means that all the CCs belong to the same RAT. Some examples of Intra-RAT multi-carrier systems are LTE FDD multi-carrier system, LTE TDD multi-carrier system, UTRAN FDD multi-carrier system, UTRAN TDD multi-carrier system. In an inter-RAT multi-carrier system, the CCs may belong to different RATs. For example, in such systems one CC may belong to LTE FDD and another one to LTE TDD. Yet another example comprises of CCs belonging to UTRAN FDD and E-UTRAN FDD. In inter-RAT multi-carrier systems one of the RATs may be considered as the main or primary RAT while the remaining ones are considered as auxiliary RATs.

A multi-carrier or CA capable UE may thus in principle be able to perform measurements on a secondary CC, and equivalently on other frequency carriers, without gaps or compressed mode, as it comprises more than one transceiver. However, this measurement capability without gaps can either be optional or mandatory in the UE. Furthermore this capability may be mandatory for a certain number of secondary CC and optional beyond that number. For example, for a multi-carrier UE supporting up to four CCs in total, it may be mandatory for the UE to measure on one secondary CC (i.e. on the second carrier) without measurement gaps but optional to measure on the remaining secondary CC (i.e. on the third and fourth carriers). This means that for a UE supporting up to two CCs in total, the measurements on the secondary CC which is the only secondary carrier may be mandatory.

As this measurement capability is optional, the UE has to separately signal the capability to the network in addition to its carrier aggregation capability signaling. Such a capability is not defined in the current standard. If defined, it will likely be a part of the RF parameters in the UE radio access capability information described above.

UE Radio Access Capability and RN Node Capability Signaling to Positioning Node

The currently defined UE radio access capabilities, as well as possible future UE radio access capabilities such as the measurement capabilities described above for multi-carrier systems, may have an impact on positioning measurement requirements and on positioning performance as will be described hereinafter:

Inter-frequency measurements and the measurement requirements have been standardized for LTE OTDOA. There is, however, no standardized means to indicate to the positioning node (E-SMLC or SLP) which frequency bands that are supported by the UE. The positioning node does thus not know whether a cell on a frequency other than the serving-cell frequency may be included in the assistance data for the given UE, in order for the UE to be able to measure that cell for positioning.

In multi-carrier/carrier aggregation systems, when including cells on the secondary carrier frequency or CC in the assistance data, the network will not know whether measurement gaps have to be configured or not. This means that by default, the system will always configure measurement gaps, without taking into account the UE capability of multi-carrier measurements without gaps or compressed mode in multi-carrier UTRA or in inter-RAT multi-carrier with e.g. a mixture of UTRA and E-UTRA CCs. A network node will e.g. always have to configure measurement gaps when cells operating on different frequencies are included in the assistance data, even if no inter-frequency measurements are configured for the UE. This is highly inefficient since it causes throughput loss due to unnecessary measurement gaps. Furthermore, the system will also try to align PRS configurations and the gaps on different frequencies accordingly, leading to performance degradation and unnecessary procedures.

When inter-frequency and/or inter-RAT positioning measurements are requested, the system does not take into account the UE capability of inter-frequency and/or inter-RAT measurement without gaps. This means that the system will always try to configure measurement gaps and/or align PRS configurations and the gaps on different frequency accordingly, leading to performance degradation and unnecessary procedures. The problem of the unnecessary procedures will increase with the introduction of multi-carrier/CA capable UEs, as there will then be a larger number of UEs which are capable of performing measurements without gaps.

The standardized RSTD measurement requirements for OTDOA currently do not take into account the UE capability of inter-carrier and/or inter-frequency measurement without gaps. This means that, in case of multi-carrier and/or inter-frequency measurements, requirements that are more relaxed will always apply as it is assumed that measurement gaps will always have to be used. This will have a negative impact on UE positioning performance.

The maximum number of supported layers for spatial multiplexing in downlink is currently not known to the positioning node and thus cannot be taken into account for optimizing positioning performance, e.g. by configuring transmit antennas accordingly.

Neither device type nor the UE release or the UE category is currently known to the positioning node and thus the information cannot be utilized for optimizing positioning performance.

Interference cancellation support or enhanced hierarchical network also known as heterogenous network support are currently not a standardized UE capability and can thus not be signaled to any node, including the positioning node. However, this information about the UE could be utilized by the positioning node in the assistance data build up, as it may give an indication which neighbor cells that may be included in the assistance data.

No CSG-specific support for positioning is currently available in the standard. The network is thus not aware of e.g. which CSG group the UE belongs to, or whether the UE is in the coverage of a CSG cell to which the UE may or may not belong to.

Figure 5:
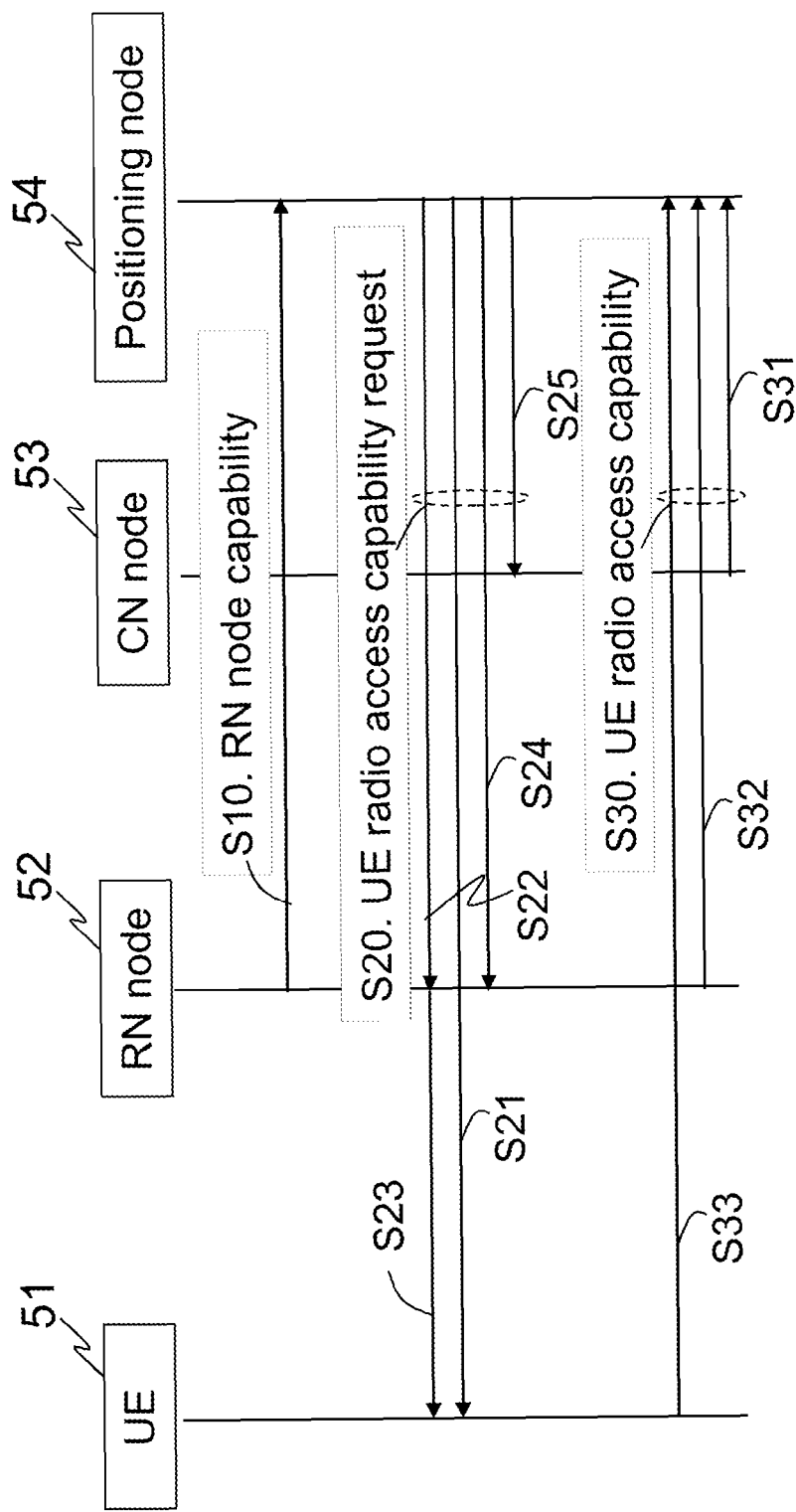
FIG. 5 is a signaling diagram schematically illustrating the signaling according to embodiments of the invention.

As indicated, the lack of UE radio access capability information may result in positioning performance degradation, even for existing and standardized service features such as inter-frequency measurements. If the positioning node is not aware of whether a certain frequency is supported by a given UE or not, the wrong cells, i.e. those which the UE won't be able to measure, may be included in the assistance data. Therefore, according to embodiments, UE radio access capabilities are signaled between any of the following nodes, as illustrated by S30 in the signaling diagram in FIG. 5:

1. As described above, the MME 53 has the information related to the UE radio access capabilities. However, this information is not available to E-SMLC 54 in a conventional system. Therefore, in a first embodiment, UE radio access capability information is signaled from the MME 53 in the CN to the positioning node 54 in S31. In one example UE radio access capability information is signaled to the E-SMLC 54 via LCS-AP protocol over the SLs interface. In one embodiment, the UE radio access capability information is included in a positioning request e.g. as a part of the "UE Positioning Capability" element. In another embodiment, the UE radio access capability information is included in a positioning request outside the "UE Positioning Capability" element, e.g. as a part of another element containing general UE capability or UE radio access capability information. This new capability information element may be included as an optional element. The request for the capabilities may be transmitted from the positioning node 54 to the MME 53, as illustrated by S25. Alternatively, no request is transmitted at all, and the capability transfer is thus unsolicited.

2. Conventionally, the UE does not report information related to its radio access capabilities to any node related to positioning. Therefore in a second embodiment of the invention, the UE 51 sends its UE radio access capability information to the positioning node 54 in S33, upon starting a session or whenever necessary. Alternatively, the UE 51 sends this information to the positioning node 54 upon receiving a request from the positioning node or from any other network node. The information can be signaled or exchanged via different protocols and mechanisms. In one alternative embodiment, this information is sent by the UE 51 to the positioning node 54 in S33 via the LPP protocol. Note that since an LPP extension, e.g. LPPe, is transmitted in an LPP message, transmitting via the LPP protocol may also mean transmitting via an LPP extension. The UE radio access capabilities may be included in the element(s) intended for common capabilities, e.g. the commonIEsRequestCapabilities and/or the commonIEsProvideCapabilities. The request for the capabilities may be transmitted over the same protocol from the positioning node 54 to the UE 51, as in S21. Note that no request for UE capabilities may be transmitted at all, and the capability transfer may thus be unsolicited. In another alternative of this second embodiment the UE radio access capability information is sent by the UE 51 to the positioning node 54 in a transparent container via a radio network node 52 such as the eNodeB, which may or may not be the serving eNodeB. The capability information may thus be encapsulated in RRC from the UE 51 to the eNode B 52 and in LPPa from the eNodeB 52 to the positioning node 54. The key aspect with such encapsulation is that the eNode B 52 does not modify any information on its way to the positioning node 54. With this alternative, the optional request for the capabilities may be transmitted from the positioning node 54 to the eNodeB 52 in S22 which then triggers the capability request transmitted by eNodeB 52 to the UE 51 in S23. The request may alternatively be transmitted from the positioning node 54 and relayed to the UE 51 in a transparent container in S21 e.g. encapsulated in RRC.

3. According to a third embodiment, the eNodeB 52 signals the UE radio access capabilities via LPPa protocol to the positioning node 54 in S32. It is assumed that the eNodeB is aware of these capabilities and that there is a possibility for transmitting such UE-associated information. For example, the eNodeB could receive or acquire this information from either the UE or from any other CN node, such as the MME. The signaling of this information by MME or by the UE to eNodeB is known in prior art. In this third embodiment, the request for the capabilities may be received by the eNodeB 52 from the positioning node 54 in S24, e.g. over LPPa. Alternatively, no request is transmitted at all, and the capability transfer is thus unsolicited e.g. on some trigger.

As already mentioned in the description of the first, second and third embodiments above, the UE radio access capability transfer with any of the above signaling solutions and between any of the described nodes may be an unsolicited procedure, e.g. transmitted without a request for the capability information. Alternatively, the UE radio access capability information is transmitted on request. Different options of transmitting the request are as described above for the corresponding signaling solutions.

At least one of the following parameters which have already been described above, may be signaled as part of the UE radio access capabilities between the nodes according to the first, second and third embodiments above:

- ue-Category: The parameters associated with each UE category may be transmitted to the positioning node provided that they are also implemented in the positioning node, i.e that the positioning node is aware of the categories.In one embodiment, only a part of the ue-Category information is signalled to the positioning node, e.g. only the maximum number of supported layers;
- supportedBandListEUTRA;
- Inter-RAT parameters indicating supported bands for other RATs, e.g. UTRA FDD, UTRA TDD, GERAN, CDMA 2000;
- interFreqNeedForGaps;
- interRAT-NeedForGaps;
- accessStratumRelease, which may be useful when some features exploited for positioning are applicable only to a certain UE release or from a certain release;
- device Type;
- CSG proximity indication parameters, such as intraFreqProximityIndication, interFreqProximityIndication and utran-ProximityIndication;
- Neighbor cell SI acquisition parameters, such asintraFreqSI-AcquisitionForHO, interFreqSI-AcquisitionForHO, utran-SI-AcquisitionForHO;
- multi-carrier or carrier aggregation capability;
- indication whether a multi-carrier or carrier aggregation capable UE is also capable of performing measurements without gaps or without compressed mode. This is valid for any UE measurement including e.g. measurements for positioning, and measurements for mobility;
- indication of frequencies and/or the number of carries for which the UE is capable of performing measurements including e.g. measurements for positioning, and for mobility without gaps or without compressed mode. It may e.g. be an indication that the UE may perform measurements without gaps for carriers in general, for contiguous carriers, and/or for non-contiguous carriers;
- indication whether a multi-carrier or carrier aggregation capable UE is also capable of performing positioning measurements in general or any specific positioning measurements, such as RSTD measurements for OTDOA, without gaps or without compressed mode;
- interference cancellation capability and/or enhanced support for operating in heterogeneous networks, e.g. UE support for restricted measurements for heterogeneous network deployments According to another embodiment, the radio network node 52, such as the eNodeB, may signal some of its capabilities to the positioning node 54, as illustrated with S10 in FIG. 5. The radio network node capabilities may be the only capabilities signaled to the positioning node. Alternatively, the radio network capabilities are signaled in addition to the UE radio access capability information. The radio network node capabilities may be of assistance in the positioning to decide e.g. whether to configure the inter-frequency measurements for a particular UE or not. The signaling of the radio network node capabilities may for example be performed using control plane protocols such as the LPPa, or using user plane protocols.

The eNodeB may or may not support CA or may support CA for certain frequency bands. If CA is supported by the eNodeB, the UE can measure the inter-frequency positioning measurements according to the rule specified for CA, e.g. without measurement gaps leading to better performance. The eNodeB may for example support CA only on band B1, although the UE supports CA on bands B1 and B2. Hence by using these sets of the capability information the positioning node can configure UE to perform inter-frequency measurement on band B1.

Furthermore, a radio network node such as the eNodeB may have limited resources such as hardware resources to process or manage a large number of measurements performed by the UE. For example the eNodeB may be able to configure gaps for positioning measurements for only a limited number of UEs around the same time. As eNodeB resource information, such as hardware capability or status, number of UEs, overall load, and composite available capacity, is exchanged between eNodeBs over the ×2 interface, the eNodeB may in embodiments signal such sets of information or similar information to the positioning node. The positioning node may therefore use one or more of these sets of information, to decide whether or not a UE should be configured for inter-frequency positioning measurement and what type of inter-frequency positioning measurements that may be used, to build up the assistance data accordingly, and/or to select a positioning method such that failures and/or delays due to overload are minimized.

It is possible to enhance inter-frequency measurement performance and ensure consistent assistance data build-up or configuration by transmitting UE radio access capability information according to the embodiments described above. Given the information about the frequency bands supported by the UE, e.g. indicated by the UE capability parameter supportedBandListEUTRA and/or from parameters indicating supported bands for other RATs, the positioning node such as the E-SMLC or the SLP may select only the cells operating on frequencies supported by the UE for inclusion in the positioning assistance data that is transmitted to the UE.

When the UE capability information is not available, the positioning node behavior may be pre-defined. It may e.g. assume that either all frequencies are supported or that only the serving-cell frequency is supported. If the network transmits a cell list which includes a cell on a frequency not supported by the UE, the UE may transmit a failure indication and/or failure cause (e.g., not supported frequency) for that cell. Currently, there is no such standardized failure cause.

The positioning node also communicates with radio network nodes, e.g. with eNodeBs over LPPa, and requests information or measurements e.g. needed for the assistance data build up. In one embodiment, the positioning node may exploit the received UE radio access capability information on the supported bands, and may request the necessary information or measurements from the cells on the frequencies that are identified to be of interest based on the supported band information.

The network should not configure measurement gaps for positioning for UEs capable of conducting inter-frequency and/or inter-RAT measurements without gaps. Furthermore, the positioning requirements should also be applied based on the UE radio access capability information related to gap configuration. More stringent requirements should be applied for UEs capable of measuring without gaps and more relaxed requirements should be applied for UEs requiring measurement gaps for the configured measurements, such as inter-frequency or inter-RAT measurements.

The gap configuration decision may be taken in a radio network node which receives the indication for a need of measurement gaps from the network. The radio network node checks own information on the UE radio access capability, and decides accordingly. The node may e.g. decide to not configure measurement gaps when the available UE radio access capability information indicates no need for gaps, or it may decide to configure gaps when there is no capability information available and the positioning node indicates the need for gaps or that inter-frequency gaps are configured. Alternatively, the decision is made by the UE based on own capability information. Still another alternative, is that the decision is made by the positioning node based on the available information about the UE radio access capability and the positioning measurement configuration or the assistance data for that UE.

The UE radio access capability information, based on which the need for measurement gaps may be decided, can be acquired e.g. from the following UE radio access capability parameters or information:

interFreqNeedForGaps;

interRAT-NeedForGaps;

accessStratumRelease, e.g. if the capability of measuring without gaps becomes mandatory from a certain release;

indication whether a multi-carrier or carrier aggregation capable UE is also capable of performing measurements without gaps or without compressed mode;

multi-carrier and/or CA capability, e.g. if the multi-carrier and/or CA capability also implies that no gaps are necessary;

indication whether a multi-carrier or CA capable UE is also capable of performing positioning measurements in general or any specific positioning measurements such as RSTD for OTDOA without gaps or without compressed mode.

The positioning performance in heterogeneous networks may also be enhanced by utilizing the UE radio access capability information. Given the information on the UE radio access capability related to the ability to effectively cancel the interference and/or related to enhanced support in the UE for operating in heterogeneous networks, the positioning node may decide to include cells associated with radio base stations of different types in the assistance data. Different types of radio base stations may e.g. be radio base stations of different power classes such as macro, micro, pico, home eNodeB.

Furthermore, muting of reference signals used for positioning may be avoided in the network if most of the UEs are capable of dealing with strong interferers. To configure "no muting", i.e. to decide that no muting is necessary for a cell, may not require communication with other nodes when cell muting is configured by the positioning node, i.e. centrally or semi-centrally. If muting configuration is decided locally by radio network nodes, the radio network nodes may receive an indication from another node, such as the positioning node or the MME, that most of the UEs in the area are capable of dealing with strong interferers. Alternatively, the radio network nodes may utilize own information or statistics about this type of UE capability in the area.

The UE radio access capability information and the eNodeB capability information may also be used for configuring antennas transmitting reference signals used for positioning. The beam-forming capability or the number of receive antennas at the UE and/or eNodeB side which may be signaled to the positioning node similarly to other capabilities previously described, may be utilized in the positioning node when building up the assistance data, when calculating the UE position, and when utilizing measurements for AECID and fingerprinting. Different databases, such as Radio Frequency fingerprinting databases and AECID databases may e.g. be supported for measurements with and without beam-forming. The ability to use a dedicated antenna for positioning may also be considered as an eNodeB capability, which may be signaled to and utilized by the positioning node.

UE radio access capability information and eNodeB capability information may be used in deployment scenarios with so called femto cells for a home eNodeB. A home eNodeB or any home base station may belong to an open access or a CSG class. The CSG is owned and at least partly managed by the subscriber, and the operator thus has less control over the CSG operation. Hence in the CSG case it may not be feasible or not sufficiently reliable that the UE performs the positioning measurements, as a CSG cell may be turned off anytime or its location may be changed by the subscriber anytime. If the home base station sends its capability information related to CSG to the positioning node, the positioning node may decide whether to include certain cells in the assistance data or not.

The UE capability of dealing with femto cells may also be accounted for in the positioning when building up the assistance data, e.g. when deciding whether to include femto cells in the neighbor cell list or not. Such a radio access capability may e.g. be the CSG proximity indication, or an advanced cell selection technique indicating that the UE does not switch to a femto cell in case a strong interference from a higher power node may be expected or the other way around, or that the UE is allowed to join a hybrid femto cell, i.e. a combined CSG/non-CSG femto cell.

The positioning node may also utilize energy-saving and/or power-saving related capability information of UEs and eNodeBs. The eNodeB may e.g. operate in a power saving mode transmiting signals relatively infrequently or turning off transmission over a period of time, and the eNodeB may send such capability information to the positioning node as a part of the radio network node capability. Furthermore, when the eNodeB changes to the power saving mode it may indicate this to the positioning node. The eNodeB may also provide detailed information about the power saving period such as the time duration of power saving, and the discontinuous transmission cycle length including on and off periods. The positioning node may thus take into account this power saving capability of the eNodeB when deciding to configure the UE for doing positioning measurements, in order to optimize positioning performance.

Furthermore, the parameter deviceType which defines whether the device does not benefit from NW-based battery consumption optimisation, may be used by the positioning node to decide the positioning method or positioning configuration for the given UE. The positioning methods or positioning configurations have different characteristics from the energy-saving and/or power-saving point of view and thus may be discriminated based on the related UE radio access capability information.

Consequently, advantages provided by the above described methods are one or more of the following:

The positioning node is aware of UE radio access capabilities and thus has more flexibility and more information when configuring for positioning.

The positioning node is aware of eNodeB capabilities and thus has more flexibility and more information available that may be used to enhance positioning or optimize positioning configuration in the network.

True multi-carrier operation for positioning is enabled.

Positioning performance is enhanced also for coming LTE releases accounting for advanced UE capabilities.

Figure 6:
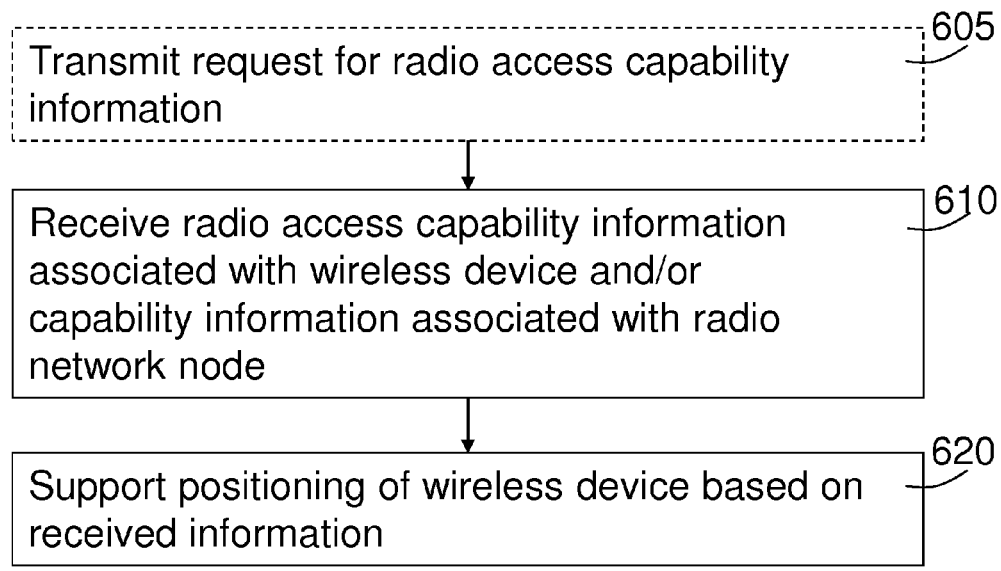
FIG. 6 is a flowchart of the method in the positioning node according to embodiments.

FIG. 6 is a flowchart of the method in the positioning node of a wireless communication system, according to embodiments of the invention. The method supports wireless device positioning. The wireless device may be a UE. The method comprises:

- 610: Receiving at least one of the following: radio access capability information associated with a wireless device; and capability information associated with a radio network node from the radio network node. The radio access capability information is in the first embodiment received from a core network node, and may be received in a positioning request. The radio access capability information is in the second embodiment received from the radio network node, and in the third embodiment from the wireless device. The first, second and third embodiments are described in more details above. The received radio access capability information may in embodiments comprise a list of frequency bands supported by the wireless device, and the list may correspond to a supportedBandListEUTRA parameter in LTE. The received radio access capability information may additionally or alternatively comprise information related to at least one of the following: a carrier aggregation capability; a capability of performing measurements without measurement gaps on at least one of a secondary carrier in carrier aggregation, an inter-frequency carrier and an inter-RAT carrier; an interference cancellation capability; and a capability of operation in heterogeneous networks. However, any of the parameters described previously as being part of the UE radio access capability information may be received by the positioning node comprised in the radio access capability information. The received capability information associated with the radio network node may comprise information related to at least one of the following: a carrier aggregation capability; a resource capability; and a power saving capability.
- 620: Supporting positioning of the wireless device based on the received radio access capability information associated with the wireless device and/or the capability information associated with the radio network node. The supporting of positioning of the wireless device may in embodiments comprise supporting at least one of: assistance data build up; requests for information necessary for positioning; positioning measurements; configuration of measurement gaps for positioning measurements; a definition of positioning requirements; enhanced positioning performance in a heterogeneous network; configuration of antennas transmitting reference signals for positioning, and configuration of reference signal muting.

In one embodiment, the method further comprises transmitting, in 605, a request for the radio access capability information before receiving the radio access capability information in 610.

Figure 7:
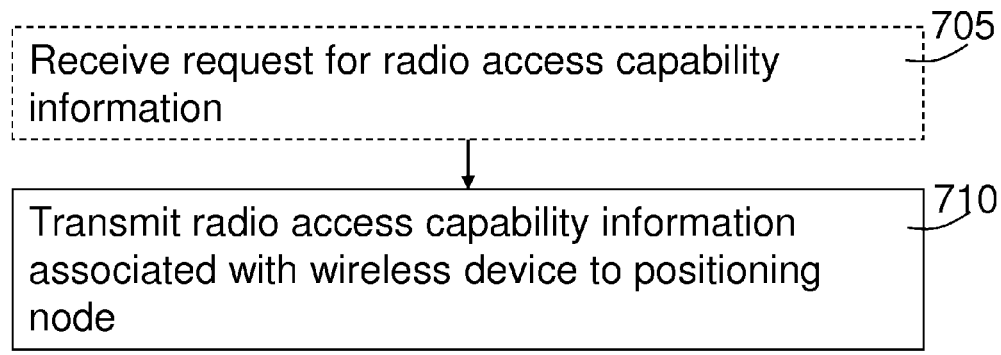
FIG. 7 is a flowchart of the method in the wireless device according to embodiments.

FIG. 7 is a flowchart of the method in a wireless device of a wireless communication system, of supporting positioning of the wireless device, the positioning being managed by a positioning node. The wireless device may be a UE. The method comprises:

- 710: Transmitting radio access capability information associated with the wireless device to the positioning node. The transmitted radio access capability information may in embodiments comprise a list of frequency bands supported by the wireless device, and the list may correspond to a supportedBandListEUTRA parameter in LTE. However, any of the parameters described previously as being part of the UE radio access capability information may be transmitted to the positioning node comprised in the radio access capability information.

In one embodiment, the method further comprises receiving a request for the radio access capability information, in 705, before transmitting the radio access capability information. The request for the radio access capability information may be received from the positioning node or from a radio network node controlling the wireless device.

Figure 8:
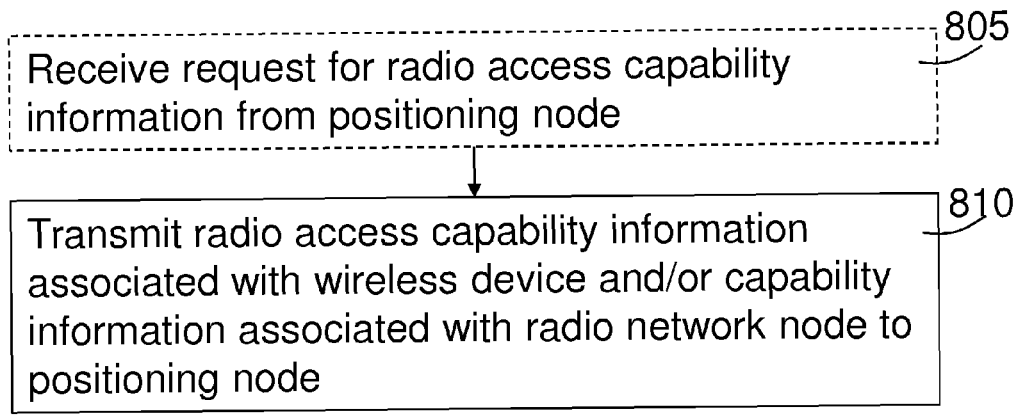
FIG. 8 is a flowchart of the method in the radio network node according to embodiments.

FIG. 8 is a flowchart of the method in the radio network node of a wireless communication system, of supporting positioning of a wireless device controlled by the radio network node. The positioning is being managed by a positioning node connected to the radio network node. The wireless device may be a UE. The method comprises:

- 810: Transmitting at least one of the following to the positioning node: radio access capability information associated with the wireless device, and capability information associated with the radio network node. The transmitted radio access capability information may in embodiments comprise a list of frequency bands supported by the wireless device, and the list may correspond to a supportedBandListEUTRA parameter in LTE. However, any of the parameters described previously as being part of the UE radio access capability information may be transmitted to the positioning node comprised in the radio access capability information.

In one embodiment, the method further comprises receiving a request for the radio access capability information, in 805, from the positioning node, before transmitting the radio access capability information.

Figure 9:
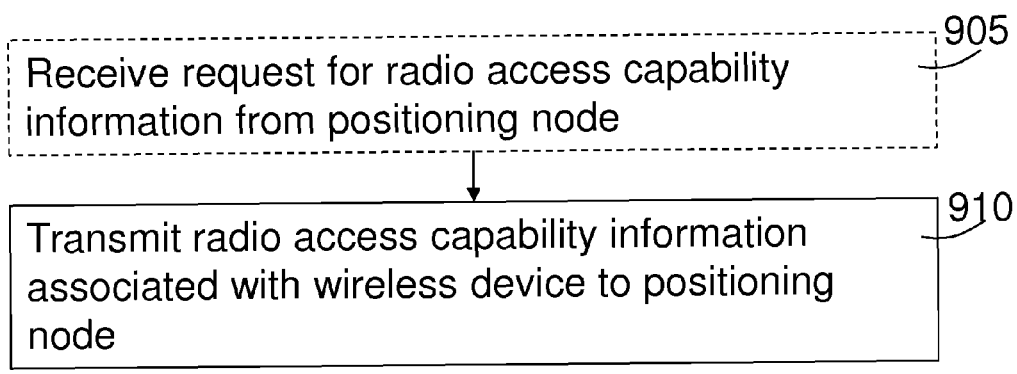
FIG. 9 is a flowchart of the method in the core network node according to embodiments.

FIG. 9 is a flowchart of the method in the core network node of a wireless communication system, of supporting positioning of a wireless device associated with the core network node. The positioning is managed by a positioning node connected to the core network node. The wireless device may be a UE. The method comprises:

- 910: Transmitting radio access capability information associated with the wireless device to the positioning node. The radio access capability information may be transmitted in a positioning request. The transmitted radio access capability information may in embodiments comprise a list of frequency bands supported by the wireless device, and the list may correspond to a supportedBandListEUTRA parameter in LTE. However, any of the parameters described previously as being part of the UE radio access capability information may be transmitted to the positioning node comprised in the radio access capability information.

In one embodiment, the method further comprises receiving a request for the radio access capability information, in 905, from the positioning node, before transmitting the radio access capability information.

Figure 10A:
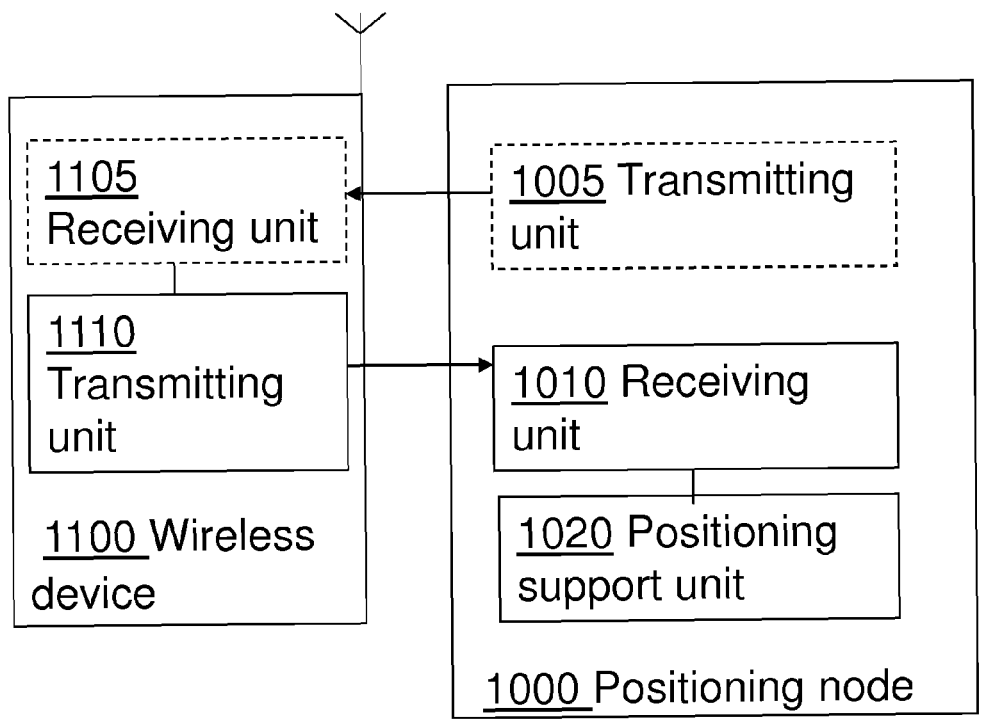
FIGS. 10a-d are block diagrams illustrating the wireless device and the network nodes according to embodiments.
Figure 10D:
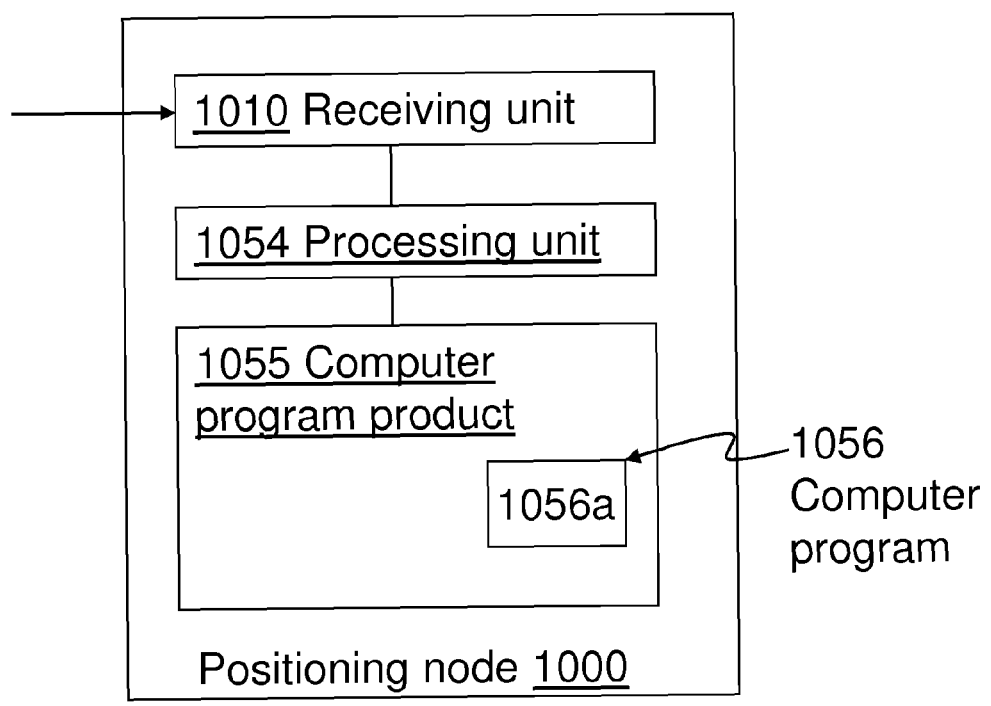
Figure 10B:
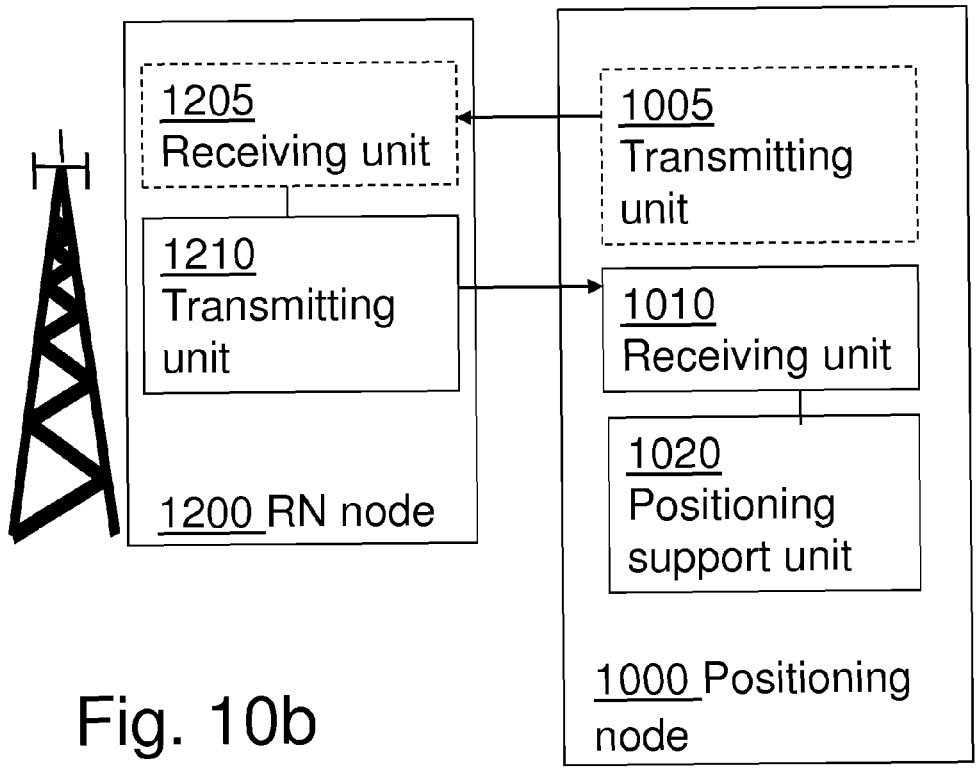
Figure 10C:
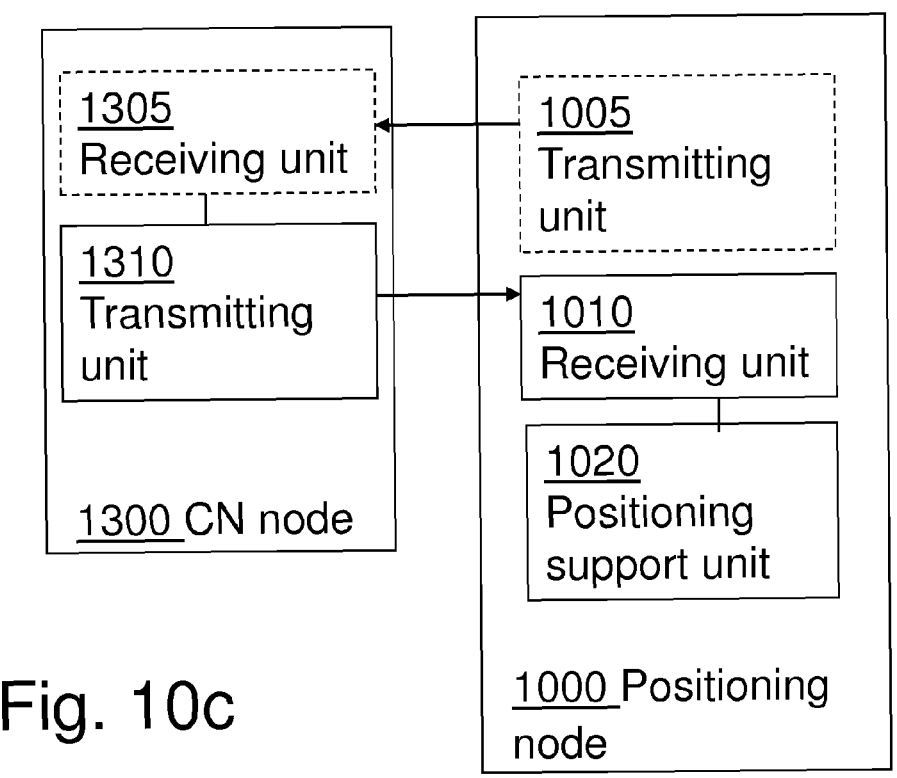

The positioning node 1000 for a wireless communication system is schematically illustrated in FIGS. 10a-10c, according to embodiments. The positioning node 1000 comprises a receiving unit 1010 adapted to receive at least one of the following: radio access capability information associated with a wireless device; and capability information associated with a radio network node from said radio network node. The wireless device may be a UE. The receiving unit 1010 may in one embodiment, corresponding to the first embodiment described above, be adapted to receive the radio access capability information from the CN node 1300, as illustrated in FIG. 10c, e.g. in a positioning request. In another embodiment corresponding to the second embodiment described above, the receiving unit 1010 is adapted to receive the radio access capability information from the radio network node

1200, as illustrated in FIG. 10*b*, and in an alternative embodiment corresponding to the third embodiment described above, it is adapted to receive the radio access capability information from the wireless device 1100, as illustrated in FIG. 10*a*. The received radio access capability information may in embodiments comprise a list of frequency bands supported by the wireless device, and the list may correspond to a supportedBandListEUTRA parameter in LTE. The received radio access capability information may additionally or alternatively comprise information related to at least one of the following: a carrier aggregation capability; a capability of performing measurements without measurement gaps on at least one of a secondary carrier in carrier aggregation, an inter-frequency carrier and an inter-RAT carrier; an interference cancellation capability; and a capability of operation in heterogeneous networks. However, any of the parameters described previously as being part of the UE radio access capability information may be received by the positioning node comprised in the radio access capability information. The received capability information associated with the radio network node may comprise information related to at least one of the following: a carrier aggregation capability; a resource capability; and a power saving capability.

The positioning node also comprises a positioning support unit 1020 adapted to support positioning of the wireless device based on the received radio access capability information associated with the wireless device and/or the capability information associated with the radio network node. The positioning support unit 1020 is in embodiments adapted to support at least one of: assistance data build up; requests for information necessary for positioning; positioning measurements; configuration of measurement gaps for positioning measurements; a definition of positioning requirements; enhanced positioning performance in a heterogeneous network; configuration of antennas transmitting reference signals for positioning, and configuration of reference signal muting.

In other embodiments, the positioning node also comprises a transmitting unit 1005 adapted to transmit a request for the radio access capability information, either to the CN node, the radio network node, or the wireless device.

The wireless device 1100 for a wireless communication system is schematically illustrated in FIG. 10*a*, according to embodiments. The wireless device may be a UE, and is configured to support positioning managed by a positioning node. The wireless device comprises a transmitting unit 1110 adapted to transmit radio access capability information associated with the wireless device to the positioning node. In embodiments, the wireless device further comprises a receiving unit 1105 adapted to receive a request for the radio access capability information. The receiving unit 1105 may be adapted to receive the request for the radio access capability information from the positioning node or from a radio network node controlling the wireless device.

The radio network node 1200 for a wireless communication system is schematically illustrated in FIG. 10*b*, according to embodiments. The radio network node may for example be an eNodeB. The radio network node 1200 is configured to support positioning of a wireless device, which may be a UE, controlled by the radio network node, the positioning being managed by a positioning node connectable to the radio network node. The radio network node comprises a transmitting unit 1210 adapted to transmit at least one of the following to the positioning node: radio access capability information associated with the wireless device, and capability information associated with the radio network node. In embodiments, the radio network node further comprises a receiving unit 1205 adapted to receive a request for the radio access capability information from the positioning node.

The CN node 1300 for a wireless communication system is schematically illustrated in FIG. 10*c*, according to embodiments. The CN node is configured to support positioning of a wireless device associated with the CN node, the positioning being managed by a positioning node connectable to the CN node. The wireless device may be a UE. The CN node 1300 comprises a transmitting unit 1310 adapted to transmit radio access capability information associated with the wireless device to the positioning node, in one embodiment in a positioning request. In embodiments, the wireless device further comprises a receiving unit 1305 adapted to receive a request for the radio access capability information from the positioning node.

The units described above with reference to FIGS. 10*a-c* are logical circuits and do not necessarily correspond to separate physical circuits.

FIG. 10*d* schematically illustrates an embodiment of the positioning node 1000, which is an alternative way of disclosing the embodiments illustrated in FIGS. 10*a-c*. The positioning node 1000 comprises a receiving unit 1010 as already described with reference to FIGS. 10*a-c*. The receiving unit 1010 may be integrated in hardware of the positioning node 1000. In other embodiments, the positioning node also comprises a transmitting unit 1005 as described above with reference to FIGS. 10*a-c*. The positioning node 1000 also comprises a processing unit 1054 which may be a single unit or a plurality of units. Furthermore, the positioning node 1000 comprises at least one computer program product 1055 with a computer readable medium in the form of a non-volatile memory, e.g. an EEPROM (Electrically Erasable Programmable Read-Only Memory), a flash memory or a disk drive. The computer program product 1055 also comprises a computer program 1056 stored on the computer readable medium, which comprises code means which when run on the positioning node 1000 causes the processing unit 1054 on the positioning node 1000 to perform the steps of the procedures described earlier in conjunction with FIG. 6.

Hence in the embodiments described, the code means in the computer program 1056 of the positioning node 1000 comprises a positioning support module 1056*a* for supporting positioning of the wireless device based on the received radio access capability information associated with the wireless device and/or the capability information associated with the radio network node. The code means may thus be implemented as computer program code structured in computer program modules. The module 1056*a* essentially performs the step 610 of the flow in FIG. 6 to emulate the positioning node described in FIGS. 10*a-c*. In other words, when the modules 1056*a* is run on the processing unit 1054, it corresponds to the unit 1020 in FIGS. 10*a-c*.

Although the code means in the embodiment disclosed above in conjunction with FIG. 10*d* are implemented as a computer program module which when run on the positioning node 1000 causes the node to perform the step described above in conjunction with FIG. 6, the code means may in alternative embodiments be implemented completely or partly in firmware, hardware or combinations thereof.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system.

It will be appreciated that procedures described above are carried out repetitively as necessary, for example, to respond to the time-varying nature of communication channels between transmitters and receivers.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

As described above, methods and apparatus in accordance with this invention include, but are not limited to, one or more of the following aspects:

On signaling, the involved interfaces and the nodes
On methods and procedures in different nodes In addition, when relevant, the embodiments apply both for the user plane and control plane positioning solutions, as well as between the user-plane positioning node (SLP) and the control-plane positioning node (E-SMLC). Also, the invention is not limited to a specific positioning method and applies, for example, for OTDOA, E-CID or any other external positioning method, or even UTDOA where UE and/or eNodeB capabilities can be communicated to the positioning node.

ABBREVIATIONS

3GPP Third Generation Partnership Project
A-GNSS Assisted-Global Navigation Satellite System
A-GPS Assisted GPS
AoA Angle of Arrival
CA Carrier Aggregation
CC Component Carrier
CN Core Network
CPICH Common Pilot Channel
CRS Cell-specific Reference Signal
CSG Closed Subscriber Group
E-CID Enhanced Cell Identity
eNodeB evolved Node B
E-SMLC Evolved SMLC
E-UTRAN Evolved Universal Terrestrial Radio Access Network
FDD Frequency Division Duplex
GPS Global Positioning System
LCS-AP Location Service Application Protocol
LPP LTE Positioning Protocol
LPPa LPP Annex
LTE Long-Term Evolution
MME Mobility Management Entity
OFDM Orthogonal Frequency Division Multiplex
OTDOA Observed Time Difference Of Arrival
PCI Physical Cell Identity
PDCCH Physical Downlink Control Channel
PLMN Public Land Mobile Network
PRS Positioning Reference Signal
RAT Radio Access Technology
RB Resource Block
RBS Radio Base Station
RE Resource Element
RRC Radio Resource Control
RS Reference Signal
RSTD Reference Signal Time Difference
SFN System Frame Number
SI System Information
SINR Signal-to-Interference Ratio
SLP SUPL Location Platform
SMLC Serving Mobile Location Center
SUPL Secure User Plane Location
TA Timing Advance
TAU Tracking Area Update
TDD Time Division Duplex
UE User Equipment
UMTS Universal Mobile Telecommunications System
UTDOA Uplink Time Difference Of Arrival

The invention claimed is:

1. A method, in a positioning node of a wireless communication system, of supporting wireless device positioning, the method comprising:
   receiving radio access capability information associated with a wireless device, wherein the radio access capability information comprises a list of frequency bands supported by the wireless device; and
   supporting positioning of the wireless device based on the received radio access capability information associated with the wireless device, wherein supporting the positioning comprises selecting only cells operating on frequencies from the list of frequency bands for inclusion in positioning assistance data transmitted to the wireless device.

2. The method according to claim 1, wherein the radio access capability information is received from a core network node.

3. The method according to claim 1, wherein the radio access capability information is received from the radio network node.

4. The method according to claim 1, wherein the radio access capability information is received from the wireless device.

5. The method according to claim 2, wherein the radio access capability information is received in a positioning request.

6. The method according to claim 1, further comprising transmitting a request for the radio access capability information before receiving the radio access capability information.

7. The method according to claim 1, wherein the list of frequency bands supported by the wireless device corresponds to a supportedBandListEUTRA parameter.

8. The method according to claim 1, further comprising receiving network-side capability information associated with a radio network node, wherein the received network-side capability information associated with the radio network node comprises information related to at least one of the following:
- a carrier aggregation capability;
- a resource capability; and
- a power saving capability.

9. The method according to claim 1, wherein supporting positioning of the wireless device comprises supporting at least one of:
- assistance data build up;
- requests for information necessary for positioning;
- positioning measurements;
- configuration of measurement gaps for positioning measurements;
- a definition of positioning requirements;
- enhanced positioning performance in a heterogeneous network;
- configuration of antennas transmitting reference signals for positioning; and
- configuration of reference signal muting.

10. A method in a wireless device of a wireless communication system, of supporting positioning of the wireless device, the positioning being managed by a positioning node, the method comprising:
- transmitting radio access capability information associated with the wireless device to the positioning node, wherein the transmitted radio access capability information comprises a list of frequency bands supported by the wireless device; and
- receiving positioning assistance data from the positioning node, the positioning assistance data being based on the radio access capability information, wherein all cells included in the positioning assistance data operate on frequencies from the list of frequency bands.

11. The method according to claim 10, further comprising receiving a request for the radio access capability information before transmitting the radio access capability information.

12. The method according to claim 11, wherein the request for the radio access capability information is received from the positioning node or from a radio network node controlling the wireless device.

13. A positioning node for a wireless communication system, the positioning node comprising one or more processing circuits configured as:
- a receiving unit adapted to receive radio access capability information associated with a wireless device, wherein the radio access capability information comprises a list of frequency bands supported by the wireless device; and
- a positioning support unit adapted to support positioning of the wireless device based on the received radio access capability information associated with the wireless device, by selecting only cells operating on frequencies from the list of frequency bands for inclusion in positioning assistance data transmitted to the wireless device.

14. A wireless device for a wireless communication system, the wireless device being configured to support positioning managed by a positioning node, and comprising one or more processing circuits configured to:
- transmit radio access capability information associated with the wireless device to the positioning node, wherein the radio access capability information comprises a list of frequency bands supported by the wireless device; and
- receive positioning assistance data from the positioning node, the positioning assistance data being based on the radio access capability information, wherein all cells included in the positioning assistance data operate on frequencies from the list of frequency bands.

15. The wireless device according to claim 14, wherein the wireless device is a user equipment.

* * * * *